May 14, 1968 A. P. ALLEGRINI ET AL 3,383,438
CALCINATION OF CLAY
Filed Dec. 17, 1965
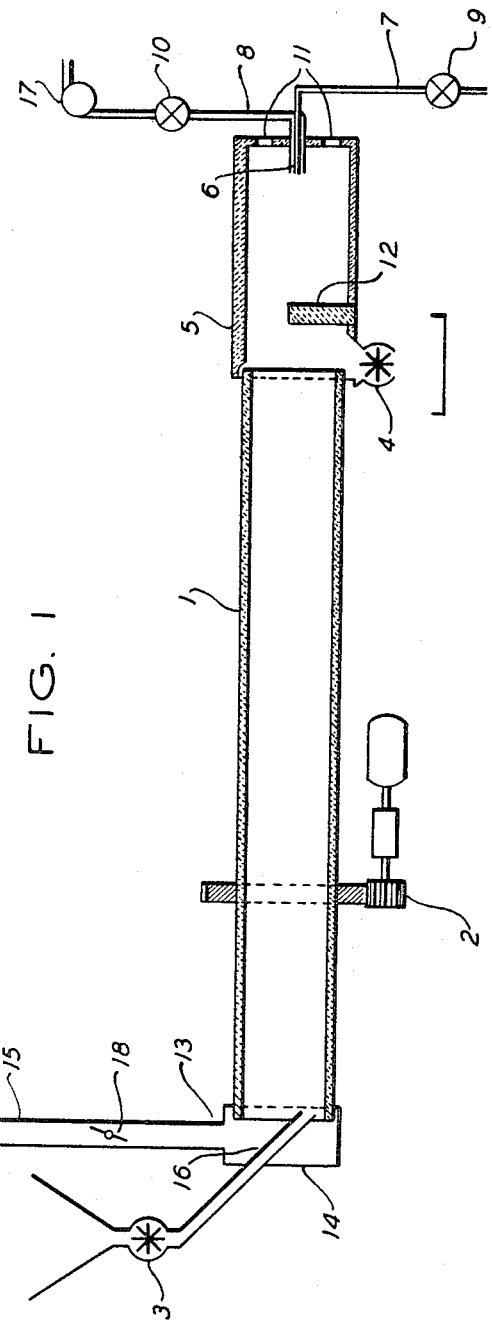
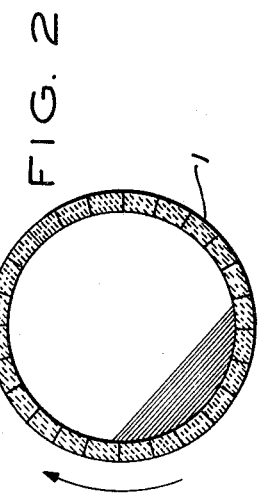
INVENTORS
ALDO P. ALLEGRINI
VICTOR PUSKAR
ERNEST W. GREENE
ATTORNEY

United States Patent Office 3,383,438
Patented May 14, 1968

3,383,438
CALCINATION OF CLAY
Aldo P. Allegrini, Westfield, Victor Puskar, Piscataway, and Ernest W. Greene, Westfield, N.J., assignors, by mesne assignments, to Engelhard Minerals & Chemicals Corporation, Newark N.J., a corporation of Delaware
Filed Dec. 17, 1965, Ser. No. 514,457
4 Claims. (Cl. 263—52)

ABSTRACT OF THE DISCLOSURE

Koalin clay is calcined to produce a pigment grade of the clay having low abrasion properties by feeding dry, powdered kaolin clay to the upper end of an indirectly fired inclined rotary calciner provided with countercurrent flow of combustion gases. Loss of clay material with flue gases is minimized by the formation of small clay balls as a result of the tumbling action within the calciner.

---

This invention relates to the preparation of a white pigment from a specific type of clay, namely, kaolin clay. The invention is especially directed to an improved method for producing a white pigment from kaolin clay by calination.

When kaolin clay is calcined at elevated temperature, the apparent whiteness or brightness of the clay is increased to a noteworthy extent. For many years kaolin clays have been calcined on a commercial basis to produce finely divided white pigments or extenders for use in the paper, resins and plastics industries. In order to obtain the optimum whiteness, it is essential to calcine kaolin clay while it is in the form of a dry powder.

Nichols-Herreshoff furnaces have been used to prepare the white pigment from kaolin clay. Reference is made to U.S. 3,014,836 to William J. Proctor, Jr. Rotary kilns of the type employed by the cement industry have also been used for the purpose. This fact is mentioned in U.S. 2,307,239 to Ben W. Rowland. A characteristics of the usual Nichols-Herreshoff furnaces and rotary cement kilns is that the charge is directly heated by a flame and/or heat directly radiated from the flame. The calcination must be carefully controlled to prevent overburning which causes sintering and fusion. As noted in the Rowland patent (supra), this results in a generally more abrasive product. With the types of calcination equipment heretofore used to calcine kaolin to make a white pigment, the residence time of the clay in the calciner is very critical and requires careful control. With rotary equipment the control must be made indirectly by measuring gas inlet and outlet temperatures and controlling the product throughput rate accordingly. Even with controlled calcination conditions, commercial calcined kaolin pigments are undesirably abrasive. The patent to Proctor (supra) brings out the fact that commercial calcined clay normally has a high abrasion value of 300 to 500.

Accordingly, an object of this invention is to provide an improved method for whitening kaolin by calcination.

Another object is to provide a method for calcining clay whereby the residence time of the clay in the calciner is not critical and the danger of overcalcining the clay is minimized.

We have discovered an improved method of calcining kaolin clay to produce a bright white pigment. Referring to the accompanying drawings:

FIGURE 1 is a diagrammatic representation of a system suitable for carrying out the process of the persent invention;

FIGURE 2 is a diagrammatic view, partially in section, of the bed of clay during the calcination treatment.

Stated briefly, in accordance with the present invention, finely divided kaolin clay is calcined on a continuous basis in a rotary calciner provided with countercurrent flow of combustion gases while maintaining the charge in the calciner out of contact with the flame and while preventing direct radiation from the flame to the charge in the calciner. Calcined clay of high brightness and comparatively low abrasiveness is discharged adjacent one end of the calciner and exhaust passes up the flue adjacent the other end of the calciner. In other words, in our process heat is transferred to the clay solely by convection from the combustion gas to the shell and exposed surface of the clay bed and by radiation from the shell to the bed.

In accordance with a preferred form of this invention, the clay takes form of a lunar bed, substantially as shown in FIGURE 2. This generally results in a more uniform product.

It was surprising the kaolin could be effectively calcined by countercurrent flow of hot combustion gases without flame impingement or flame radiation since larger gas volumes and high gas velocities are required with such a system than in conventional calcination operations in which the flame directly supplies a substantial part of the heat load. It is well known that when direct-fired rotaries are operated with high gas velocities and large gas volumes fine particles are likely to be passed off in the stack with the exhaust gases. The operativeness of the process of the present invention depends upon a unique characteristic of powdered kaolin clay. Kaolin is composed of micronized platelets. When tumbled in dry state or condition, the kaolin clay platelets tend to ball up to form small, generally spherical agglomerates, similar to peas in size. The mass of these agglomerates is greater than that of discrete clay particles. Therefore, the agglomerates remain in the shell in the form of a generally continuous bed of clay which descends countercurrently to the flow of hot gases. Consequently, kaolin clay is not carried out of the flue by the hot gases. On the other hand, dry fine (minus 100 mesh) clays which do not agglomerate when tumbled in a rotary shell would be carried away along with exhaust gases in a rotary kiln operating with the gas velocity ranges usually encountered in kilns of practical design. The Georgia-Florida fuller's earth clays are of this type. Consequently, when these clays are calcined they are ground to a relatively coarse size (preferably plus 60 mesh) prior to calcination in rotary kilns and then pulverized to finer sizes, if desired. Such clay would not be amenable to the process of this invention.

Referring now to the drawings, a calcination system suitable for use in carrying out this invention is composed of an inclined, refractory-lined shell, generally indicated at 1; means 2, such as a motor and trunion-roll-bearing assembly, for rotating the shell; means 3, such as a rotary valve, for charging powdered clay at a controlled rate adjacent the upper end of the shell; means 4, such as a rotary valve, for discharging clay adjacent the lower end of the shell at a controlled rate; a stationary firebox 5 abutting the lower end of shell 1; and a burner, generally indicated at 6, passing through an end wall of firebox 5. Pipes 7 and 8 for admitting fuel and air are in communication with burner 6 and are provided with valve means 9 and 10, respectively, for controlling the rate of flow of fluid therein. A series of ports, 11, is provided in the end wall of firebox 5 for admitting controlled amounts of air therein. A blower 17 is supplied to force air into pipe 8 at a controllable rate. Adjacent the base of the firing box 5 at a location opposite burner 6 is a shield 12 composed of refractory brick. This shield is generally perpendicular to the base of firing box 5 and is located at a position relative to burner 6 and shell 1 such that substantially all of the heat radiated by the flame produced by burner 6 impinges the shield without radiating directly to the contents of shell 1.

Stack 13 which encloses and seals the upper end of shell 1 is composed of a lower base member 14 and a flue 15 which is in communication with the atmosphere. An inclined deflector 16 overlies clay inlet 3, and prevents passage of uncalcined clay feed through the flue. A damper 18 is stationed in flue 15 for regulating the draft in the flue.

Shell 1 is a conventional brick-lined cylinder capable of withstanding temperatures up to about 2500° F. to 3000° F. The shell can have an intermediate lining of insulating block to reduce heat loss.

In carrying out the process of the invention, charge clay is employed in the form of dry particles substantially all of which are finer than 325 mesh (Tyler), corresponding to about 44 microns. This powdered clay is fed into the rotating shell on a continuous basis through rotary valve 3. As it tumbles down the shell 1, the clay balls up. When operating the system under preferred conditions, the clay forms a lunar bed, substantially as illustrated in FIGURE 2. The bed is heated by convection from the combustion gases produced at burner 6 and by radiation of heat transferred to the shell by convection of these gases. The clay in the calciner does not "see" the flame and it does not receive heat directly radiated by the flame in firing box 5 because of the presence of refractory shield 12. The operation of the burner 6 is controlled in a manner such that the inlet gas temperature is within the range of about 1800° F. to 2400° F. In producing the form of calcined kaolin usually referred to as "metakaolin," the air inlet temperature is within the range of 1800° F. to 2200° F. In producing a form of calcined clay pigment which is somewhat whiter but more abrasive than metakaolin, the clay is calcined with an air inlet temperature within the range of 2000° F. to 2400° F. Product temperature is within the range of 1800° F. to 2100° F. The outlet gas temperature is typically within the range of 600° F. to 1300° F. and depends upon the temperature of the inlet gases and the efficiency of heat transfer in the kiln. Residence time of the clay in the shell is usually within the range of ½ to 2 hours. As mentioned, this time is noncritical in terms of product quality.

The calcined clay product is discharged from the shell through rotary valve 4 and is composed of small (typically ¼") friable agglomerates. The hot clay can be discharged to a vibratory conveyer belt on which it cools. After cooling, the calcined clay is pulverized to minus 325 mesh in a hammer mill or other suitable system.

The pulverized calcined clay product is substantially whiter than the feed clay. The whiteness will vary with the purity and color of charge clay. As mentioned above, the whiteness will also vary with the severity of the calcination treatment. With relatively high inlet gas temperatures of 2100° F. to 2400° F., the clay will be whiter than when lower inlet temperatures are employed. However, abrasiveness of the clay product increases with the severity of the calcination. A characteristic of our clay product is that it is free from the vitreous particles which can be seen in prior art commercial calcined kaolin products when observed under an optical microscope. Another characteristic of our product is that at any given whiteness value, the clay will generally be appreciably less abrasive than a clay calcined to a similar whiteness value by prior art procedures in which there is flame impingement and/or direct radiation from the flame. To illustrate, a representative high purity unfractionated Georgia kaolin calcined to a brightness of about 90% usually has an abrasiveness of 300 to 500 when calcined by prior art techniques. When calcined to a brightness of about 90% by our process, the clay will usually have an abrasiveness of 80 to 150. (Brightness values and abrasive values refer to those obtained by the procedures described in said patent to Proctor.)

In an illustrative embodiment of this invention, crude Georgia kaolin clay was dispersed in water with sodium silicate as the dispersant, degritted and fractionated hydraulically to obtain a slip of fine size paper coating fraction composed of particles at least 92% minus 2 microns (equivalent spherical diameter). The slip was flocced, filtered, bleached, washed and then dried at a temperature below 250° F. The dried clay was pulverized in a hammer mill to substantially 100% minus 325 mesh (Tyler).

Employing a 4' x 30' rotary calciner with the charge shielded from the flame and from direct radiation from the flame, as illustrated in FIGURE 1, the calciner was operated at a speed of 1.25 r.p.m., a clay feed rate of about 800 lb./hr., a gas inlet temperature of 2300° F. and a gas outlet temperature of 1090° F. The gas velocity in the shell ranged from 500 to 900 ft./min. (calculated). Under the conditions employed, the clay formed a lunar bed substantially as illustrated in FIGURE 2. A comparison of some of the properties of the clay before and after the calcination are as follows:

|  | Charge Clay | Pulverized Calcined Clay Product |
|---|---|---|
| Color 1 (G.E. brightness) | 87.5 | 93.0 |
| L.O.I.[1] percent | 13.7 | <1 |
| Apparent density, lbs./ft.³ | 13.8 | 16.8 |
| Abrasiveness | <15 | <150 |
| +325 Mesh residue, wt. percent |  | 0.004 |

[1] Loss on ignition, determined at 1,800° F.

We claim:
1. A method for calcining clay which comprises charging dry powdered kaolin particles to the upper end of an inclined rotary calciner, rotating the calciner at a speed such that the clay particles form a bed comprising generally spherical agglomerates, burning fuel external to the calciner, admitting the resulting combustion gases into said rotary calciner countercurrently to the flow of clay while preventing contact of the flame with the clay and preventing direct radiation from the flame to the clay, discharging calcined clay adjacent the lower end of said calciner and removing exhaust gases adjacent the upper end of said calciner.

2. The method of claim 1 in which the clay in the calciner is in the form of a lunar bed.

3. The method of claim 1 in which the gas inlet temperature is within the range of 2000° F. to 2400° F.

4. The method of claim 3 in which the gas outlet temperature is within the range of 600° F. to 1300° F.

References Cited
UNITED STATES PATENTS 2,865,622  12/1958  Ross _____ 263—33
3,236,606  2/1966  Moore et al. _____ 263—32 X JAMES W. WESTHAVER, *Primary Examiner.*